United States Patent
Wang et al.

(10) Patent No.: US 12,486,232 B2
(45) Date of Patent: Dec. 2, 2025

(54) METHOD FOR PREPARING META-FUNCTIONALIZED PYRIDINE COMPOUND

(71) Applicant: NANKAI UNIVERSITY, Tianjin (CN)

(72) Inventors: Xiaochen Wang, Tianjin (CN); Zhong Liu, Tianjin (CN); Jiahao He, Tianjin (CN); Junjie Tian, Tianjin (CN); Xinyue Zhou, Tianjin (CN)

(73) Assignee: NANKAI UNIVERSITY, Tianjin (CN)

( * ) Notice: Subject to any disclaimer, the term of this patent is extended or adjusted under 35 U.S.C. 154(b) by 0 days.

(21) Appl. No.: 18/038,029

(22) PCT Filed: Oct. 15, 2021

(86) PCT No.: PCT/CN2021/124108
§ 371 (c)(1),
(2) Date: May 23, 2023

(87) PCT Pub. No.: WO2023/039975
PCT Pub. Date: Mar. 23, 2023

(65) Prior Publication Data
US 2025/0179021 A1    Jun. 5, 2025

(30) Foreign Application Priority Data

Sep. 17, 2021   (CN) .......................... 202111093323.6

(51) Int. Cl.
| | | |
|---|---|---|
| *C07D 213/56* | (2006.01) | |
| *C07D 211/82* | (2006.01) | |
| *C07D 213/26* | (2006.01) | |
| *C07D 213/55* | (2006.01) | |
| *C07D 213/61* | (2006.01) | |

(52) U.S. Cl.
CPC .......... *C07D 213/56* (2013.01); *C07D 211/82* (2013.01); *C07D 213/26* (2013.01); *C07D 213/55* (2013.01); *C07D 213/61* (2013.01)

(58) Field of Classification Search
CPC .................................................. C07D 213/56
See application file for complete search history.

(56) References Cited

U.S. PATENT DOCUMENTS

2005/0113336 A1*  5/2005  Comins ................. C07F 7/0814
546/14

OTHER PUBLICATIONS

Fan, Xiaoting et. al. "Organoborane Catalyzed Regioselective 1,4-Hydroboration of Pyridines" J. Am. Chem. Soc. 2015, 137, 4916-4919.*
Vanden Eynde "A novel application of the oxidizing properties of pyridinium chlorochromate : aromatization of Hantzsch 1,4-dihydropyridines" Tetrahedron vol. 48, Issue 3, 1992, 463-468.*
S. M. Mcelvain, et al., The Halogenation of Pyridine, 1943, pp. 2227-2233, vol. 65.
Kei Murakami, et al., C—H Functionalization of Azines, Chem. Rev., 2017, pp. 9302-9332, vol. 117.
Mengchun Ye, et al., Ligand-Promoted C3-Selective Arylation of Pyridines with Pd Catalysts: Gram-Scale Synthesis of (±)-Preclamol, J. Am. Chem. Sac., 2011, pp. 19090-19093, vol. 133.
Mengchun Ye, et al., Ligand-Promoted C-3 Selective C—H Olefination of Pyridines with Pd Catalysts, J. Am. Chem. Soc., 2011, pp. 6964-6967, vol. 133.
Ibraheem A. I. Mkhalid, et al., Ir-Catalyzed Borylation of C—H Bonds in N-Containing Heterocycles: Regioselectivity in the Synthesis of Heteroaryl Boronate Esters**, Angew. Chem. Int. Ed., 2006, pp. 489-491, vol. 45.
Jaclyn M. Murphy, et al., Meta Halogenation of 1,3-Disubstituted Arenes via Iridium-Catalyzed Arene Borylation, J. Am. Chem. Soc., 2007, pp. 15434-15435, vol. 129, No. 50.
Matthew A. Larsen, et al., Iridium-Catalyzed C—H Borylation of Heteroarenes: Scope, Regioselectivity, Application to Late-Stage Functionalization, and Mechanism, J. Am. Chem. Sac., 2014, pp. 4287-4299, vol. 136.
Chen Cheng, et al., Iridium-Catalyzed Silylation of Aryl C—H Bonds, J. Am. Chem. Soc., 2015, pp. 592-595, vol. 137.
Zhi-Yun Liu, et al., B(C6F5)3-Catalyzed Cascade Reduction of Pyridines, Angew. Chem. Int. Ed., 2017, pp. 5817-5820, vol. 56.
Jun-Jie Tian, et al., Borane-Catalyzed Chemoselective and Enantioselective Reduction of 2-Vinyl-Substituted Pyridines, Angew. Chem. Int. Ed., 2020, pp. 18452-18456, vol. 59.
Merle Arrowsmith, et al., Magnesium-Catalyzed Hydroboration of Pyridines, Organometallics, 2011, pp. 5556-5559, vol. 30.

* cited by examiner

Primary Examiner — David K O'Dell
(74) Attorney, Agent, or Firm — Bayramoglu Law Offices LLC

(57) ABSTRACT

A method for preparing a meta-functionalized pyridine compound is provided. The method has a first step, S1, for preparation of 1,4-dihydropyridine, involving: in a glove box filled with nitrogen, adding a catalyst, a solvent, pinacolborane and pyridine to a reaction flask in order and stirring the mixture at 40-110° C. for a reaction for 5-12 hours to obtain 1,4-dihydropyridine. In a second step, S2, catalyzed functionalization of pyridine at the meta-position is provided by adding an imine, an aldehyde, a ketone or a halogenation reagent to the above reaction flask, and stirring the mixture in a nitrogen atmosphere until the reaction is completed; and performing distillation under reduced pressure to remove the solvent and column chromatography separation to obtain a meta-functionalized pyridine, wherein the reaction temperature is 40-110° C., and the reaction time is 5-24 hours.

16 Claims, No Drawings

METHOD FOR PREPARING META-FUNCTIONALIZED PYRIDINE COMPOUND

CROSS REFERENCE TO RELATED APPLICATIONS

This application is the national stage entry of International Application No. PCT/CN2021/124108 filed Oct. 15, 2021, and which is based upon and claims priority to Chinese Patent Application No. 202111093323.6 filed Sep. 17, 2021, the entire contents of which are incorporated by reference herein.

TECHNICAL FIELD

The present invention relates to the field of chemical synthesis, in particular to a method for preparing a meta-functionalized pyridine compound.

BACKGROUND

Compounds with a pyridine structure widely exist in natural products and pharmaceutical molecules. Direct functionalization of a pyridine C—H bond is the most direct and efficient approach to synthesize and modify pyridine compounds. Due to the intrinsic electron deficiency of pyridine, the ortho- and para-positions thereof have a higher activity for a nucleophilic substitution reaction. Meta-functionalization of pharmaceutical molecules containing a pyridine skeleton can enrich the diversity of pharmaceutical molecules on the one hand and can improve the biological activity of the pharmaceutical molecules on the other hand, so it has a great application potential. However, since the activity of the electrophilic substitution reaction at the meta-position is relatively low, functionalization of the pyridine at the meta-position has some challenges.

At present, there are two strategies to achieve functionalization of pyridine at the meta-position. One of the strategies is the electrophilic substitution of pyridine at a high temperature:

a) Electrophilic substitution of pyridine:

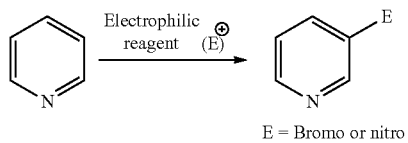

E = Bromo or nitro

The other one is a strategy of carbon-hydrogen bond activation catalyzed by a transition metal:

b) Transition-metal-catalyzed functionalization of pyridine carbon-hydrogen bond at the meta-position:

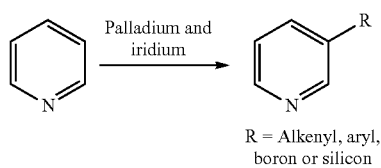

R = Alkenyl, aryl, boron or silicon

However, the above-mentioned methods have great limitations. For example, the above-mentioned electrophilic substitution reactions require a temperature as high as 300° C., and few electrophilic reagents are applicable. In addition, in the strategy of carbon-hydrogen bond activation, a large excess of pyridine is generally needed, and a mixture of ortho-, para- and meta-substituted pyridines is usually obtained, which is difficult to separate and purify.

By triarylborane-catalyzed hydroboration of pyridine, 1,4-dihydropyridine can be obtained, and after transfer hydrogenation, the reduction of the pyridine can be realized. However, there has been no report on the use of the 1,4-dihydropyridine resulting from the hydroboration of pyridine to realize functionalization of the pyridine.

SUMMARY

An object of the present invention is to provide a method for preparing a meta-functionalized pyridine compound. The method has mild reaction conditions, a high regioselectivity, no need for a noble metal catalyst, and a relatively good functional group compatibility.

To this end, the technical solution of the present invention is as follows:

A method for preparing meta-functionalized pyridine compound, the method comprising the following steps:

S1, preparation of 1,4-dihydropyridine, involving:

in a glove box filled with nitrogen, adding a catalyst, a solvent, pinacolborane and pyridine to a reaction flask in order and stirring the mixture for a sufficient reaction to obtain 1,4-dihydropyridine, with the reaction formula as follows:

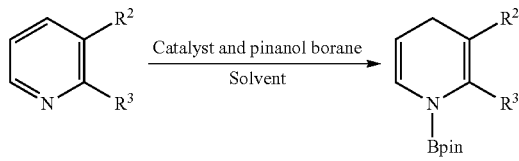

wherein:

the catalyst is triarylborane, the molar ratio of the triarylborane to the pyridine is (10-15):100, and the structural formula of the triarylborane is $B(R^1)_3$, wherein $R^1$ is phenyl, pentafluorophenyl, 3,5-bis(trifluoromethyl)-substituted phenyl, or 2,4,6-trifluoro-substituted phenyl;

the equivalent ratio of the pinacolborane to the pyridine is 1.5:1;

the solvent is tetrahydrofuran, 1,2-dichloroethane or an aromatic solvent; and the reaction temperature is 40-110° C., and the reaction time is 5-12 hours; and S2, catalyzed functionalization of pyridine at the meta-position, involving:

adding an imine, an aldehyde, a ketone or a halogenation reagent to the above reaction flask, and stirring the mixture in a nitrogen atmosphere until the reaction is completed; and performing distillation under reduced pressure to remove the solvent and column chromatography separation to obtain a pyridine compound substituted with aminomethyl, hydroxymethyl, benzyl, chlorine or bromine at the meta-position, with the reaction formula as follows:

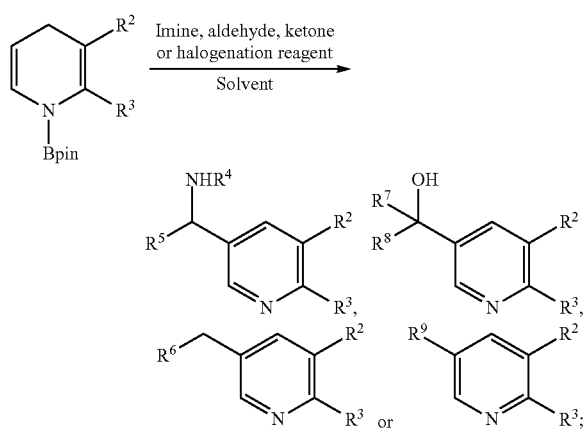

wherein the reaction temperature is 40-110° C., and the reaction time is 5-24 hours; and in the structural formula of the above pyridine, 1,4-dihydropyridine, and pyridine compound substituted with aminomethyl, hydroxymethyl, benzyl, chlorine or bromine at the meta-position, $R^2$ is an alkenyl, aryl, alkyl, halogen, ester or heteroaryl substituent, $R^3$ is alkyl, $R^4$ is tert-butoxycarbonyl or benzyloxycarbonyl, $R^5$ is an aryl, alkyl or heteroaryl substituent, $R^6$ is aryl, $R^7$ is an ester group, $R^8$ is an ester group or trifluoromethyl, and $R^9$ is chlorine or bromine.

Preferably, the 4 Å molecular sieve is further added to the reactants of step S1, and the feeding ratio of the 4 Å molecular sieve to the pyridine is 50 mg/0.2 mmol.

Preferably, in step S2, the imine is

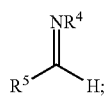

the aldehyde is

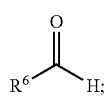

the ketone is

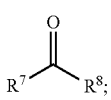

and the halogenation reagent is

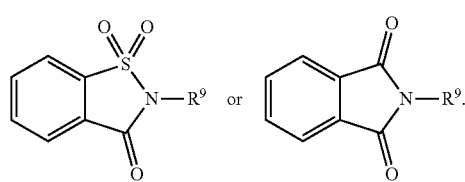

When $R^2$ is a halogen, the halogen is fluorine, chlorine or iodine;

and when $R^2$ is heteroaryl, the heteroaryl is furyl, thienyl or pyridyl.

Preferably, $R^3$ is methyl.

When $R^5$ is heteroaryl, the heteroaryl is furyl, thienyl or pyridyl.

Preferably, $R^6$ is m-nitro- or m-trifluoromethyl-substituted phenyl.

Preferably, $R^7$ is a methyl ester group or an ethyl ester group.

When $R^8$ is an ester group, the ester group is a methyl ester group or an ethyl ester group.

In the present invention, with triarylborane as a catalyst, by means of a two-step reaction in tandem, i.e. the preparation of 1,4-dihydropyridine and the catalyzed meta-functionalization of pyridine, the meta-functionalization of pyridine is realized, and a series of meta-substituted pyridine products are synthesized.

Compared with the prior art, the present invention has the following beneficial effects:

1. the method has mild reaction conditions, and the lowest reaction temperature is only 40° C.;
2. in the present invention, only 1 equivalent of pyridine raw material is required, the utilization rate of atoms is high, and the waste of resources is avoided;
3. in the present invention, a meta-substituted pyridine compound is obtained singly, and the regioselectivity is high;
4. the present invention has pyridine substrates with a wide application range, including monosubstituted and polysubstituted pyridines, pyridine derivatives, etc., and has a strong compatibility with functional groups, such as aryl, alkyl, halogen, alkenyl, and heteroaryl;
5. in the present invention, a borane catalyst is used to replace a transition metal, which reduces the production cost and environmental pollution; and
6. the present invention is suitable for later functionalization modification of a pharmaceutical molecule containing a pyridine structure, and can be applied to drug research, development and production.

DETAILED DESCRIPTION OF THE EMBODIMENTS

The method of the present invention will be described in detail below in conjunction with specific examples.

In the reaction formulas of the following examples, LA is a catalyst; HBpin is pinacolborane; MS is a molecular sieve; THF is tetrahydrofuran; and equiv is equivalent.

Example 1

A method for preparing 3-(1-phenyl-N-Boc-methylamino)-5-phenylpyridine, the method comprising the following steps:

S1, in a glove box filled with nitrogen, 13.0 mg (0.02 mmol, 10.0 mol %) of a catalyst (LA), 50 mg of a 4 Å molecular sieve, 1 mL of tetrahydrofuran, 38.4 mg (0.3 mmol, 1.5 equiv) of pinacolborane and 31.0 mg (0.2 mmol, 1.0 equiv) of 3-phenylpyridine (1a) were added to an 8 mL reaction vial in order, and reacted at 80° C. for 5 hours to obtain 1,4-dihydropyridine, with the reaction formula as follows:

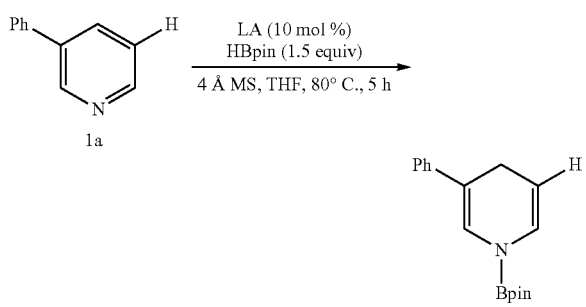

wherein the catalyst LA was B (3,5-(CF$_3$)$_2$C$_6$H$_3$)$_3$, and the structural formula was as follows:

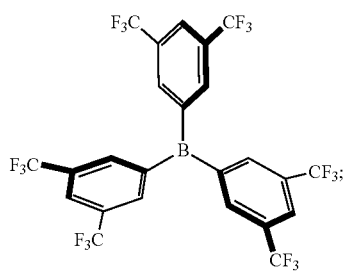

S2, cooling the system to room temperature, adding 82.0 mg (0.4 mmol, 2.0 equiv) of benzaldehyde N-Boc imine (2a) to the above reaction vial, and reacting the mixture at 80° C. for 14 hours, with the reaction formula as follows:

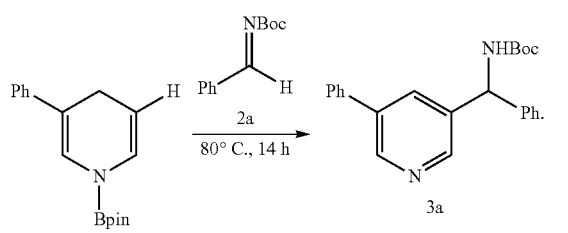

After the reaction was completed, the solvent was removed by rotary evaporation, and the residue was separated and purified by silica gel column chromatography to obtain the product 3-(1-phenyl-N-Boc-methylamino)-5-phenylpyridine (tert-butyl (phenyl (5-phenylpyridin-3-yl) methyl)carbamate) (3a) as a white solid, with a yield of 80%.

The product was characterized as follows:

$^1$H NMR (400 MHZ, CDCl$_3$) δ 8.70 (d, J=2.0 Hz, 1H), 8.50 (d, J=2.0 Hz, 1H), 7.73 (s, 1H), 7.52-7.50 (m, 2H), 7.45-7.42 (m, 2H), 7.39-7.37 (m, 1H), 7.35-7.25 (m, 5H), 6.01 (s, 1H), 5.57 (s, 1H), 1.44 (s, 9H). $^{13}$C NMR (101 MHz, CDCl$_3$) δ 155.2, 147.6, 147.3, 141.0, 137.8, 137.7, 136.5, 133.2, 129.2, 129.1, 128.3, 128.0, 127.5, 127.3, 80.3, 56.8, 28.5. HRMS-ESI: m/z calculated for C$_{23}$H$_{24}$N$_2$O$_2$Na$^+$ (M+Na)$^+$ 383.1730. found 383.1733.

Example 2

A method for preparing 3-(1-phenyl-N-Boc-methylamino)-5-benzylpyridine, the method comprising the following steps:

S1, in a glove box filled with nitrogen, 13.0 mg (0.02 mmol, 10.0 mol %) of the catalyst (LA) B(3,5-(CF$_3$)$_2$ C$_6$H$_3$)$_3$, a 4 Å molecular sieve (50 mg), 1 mL of tetrahydrofuran, 38.4 mg (0.3 mmol, 1.5 equiv) of pinacolborane and 33.8 mg (0.2 mmol, 1.0 equiv) of 3-phenylpyridine (1b) were added to an 8 mL reaction vial in order, and reacted at 80° C. for 12 hours to obtain 1,4-dihydropyridine, with the reaction formula as follows:

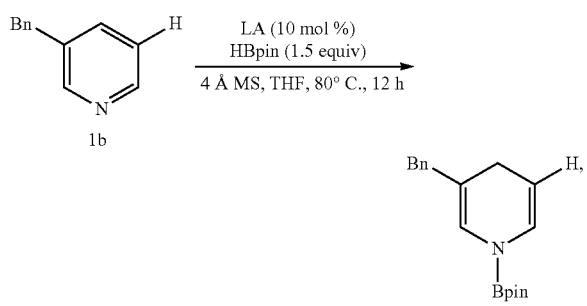

wherein the catalyst LA was the same as that in Example 1, i.e. B (3,5-(CF$_3$)$_2$C$_6$H$_3$)$_3$; and S2, cooling the system to room temperature, and adding 82.0 mg (0.4 mmol, 2.0 equiv) of benzaldehyde N-Boc imine (2a) to the reaction vial, and reacting the mixture at 80° C. for 24 hours, with the reaction formula as follows:

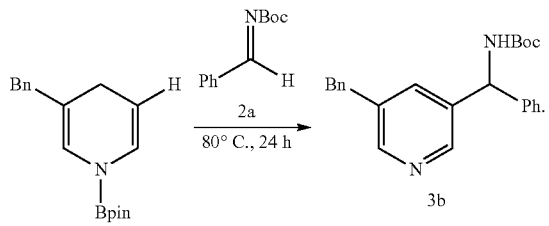

After the reaction was completed, the solvent was removed by rotary evaporation, and the residue was separated and purified by silica gel column chromatography to obtain the product 3-(1-phenyl-N-Boc-methylamino)-5-phenylpyridine (tert-butyl ((5-benzylpyridin- 3-yl)(phenyl) methyl)carbamate) (3b) as a white solid, with a yield of 72%.

The product was characterized as follows:

$^1$H NMR (400 MHz, CDCl$_3$) δ 8.34-8.33 (m, 2H), 7.36 (s, 1H), 7.32-7.25 (m, 5H), 7.21-7.17 (m, 3H), 7.13-7.11 (m, 2H), 5.89 (s, 1H), 5.42 (s, 1H), 3.93 (s, 2H), 1.41 (s, 9H). $^{13}$C NMR (101 MHz, CDCl$_3$) δ 155.1, 149.2, 146.8, 141.0, 139.7, 137.6, 136.3, 135.2, 129.0, 128.9, 128.8, 127.9, 127.5, 126.6, 80.2, 56.7, 39.1, 28.4. HRMS-ESI: m/z calculated for C$_{24}$H$_{27}$N$_2$O$_2$$^+$ (M+H)$^+$ 375.2067. found 375.2069.

Example 3

A method for preparing 3-(1-phenyl-N-Boc-methylamino)-5-phenyl-6-methylpyridine, the method comprising the following steps:

S1, in a glove box filled with nitrogen, 13.0 mg (0.02 mmol, 10.0 mol %) of a catalyst (LA), a 4 Å molecular sieve (50 mg), 1 mL of tetrahydrofuran, 38.4 mg (0.3 mmol, 1.5 equiv) of pinacolborane and 33.8 mg (0.2 mmol, 1.0 equiv) of 2-methyl-3-phenylpyridine (1c) were added to an 8 mL reaction vial in order, and reacted at 40° C. for 12 hours to obtain 1,4-dihydropyridine, with the reaction formula as follows:

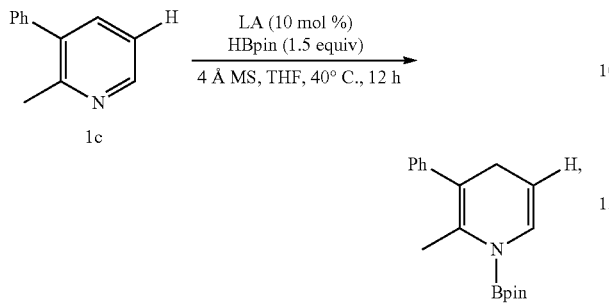

wherein the catalyst LA was the same as that in Example 1, i.e. B $(3,5\text{-}(CF_3)_2C_6H_3)_3$; and S2, cooling the system to room temperature, and adding 82.0 mg (0.4 mmol, 2.0 equiv) of benzaldehyde N-Boc imine (2a) to the reaction vial, and reacting the mixture at 40° C. for 24 hours, with the reaction formula as follows:

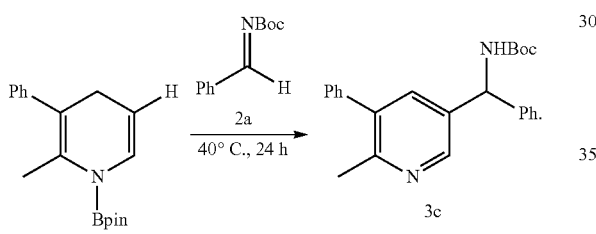

After the reaction was completed, the solvent was removed by rotary evaporation, and the residue was separated and purified by silica gel column chromatography to obtain the product 3-(1-phenyl-N-Boc-methylamino)-5-phenyl-6-methylpyridine (tert-butyl ((6-methyl-5-phenylpyridin-3-yl) (phenyl)methyl)carbamate) (3c) as a white solid, with a yield of 66%.

The product was characterized as follows:

$^1$H NMR (400 MHZ, CDCl$_3$) δ 8.44 (d, J=1.9 Hz, 1H), 7.44-7.25 (m, 11H), 5.95 (s, 1H), 5.19 (s, 1H), 2.49 (s, 3H), 1.44 (s, 9H). $^{13}$C NMR (101 MHz, CDCl$_3$) δ 155.1, 155.1, 146.9, 141.2, 139.9, 136.9, 136.1, 135.2, 129.2, 129.1, 128.6, 128.0, 127.7, 127.5, 80.4, 56.6, 28.5, 23.2. HRMS-ESI: m/z calculated for $C_{24}H_{27}N_2O_2^+$ (M+H)$^+$ 375.2067. found 375.2063.

Example 4

A method for synthesizing 3-(1-cyclohexyl-N-Boc-methylamino)-5-phenylpyridine, the method comprising the following steps:

S1, in a glove box filled with nitrogen, 13.0 mg (0.02 mmol, 10.0 mol %) of a catalyst (LA), a 4 Å molecular sieve (50 mg), 1 mL of tetrahydrofuran, 38.4 mg (0.3 mmol, 1.5 equiv) of pinacolborane and 31.0 mg (0.2 mmol, 1.0 equiv) of 3-phenylpyridine (1a) were added to an 8 mL reaction vial in order, and reacted at 80° C. for 12 hours to obtain 1,4-dihydropyridine, with the reaction formula as follows:

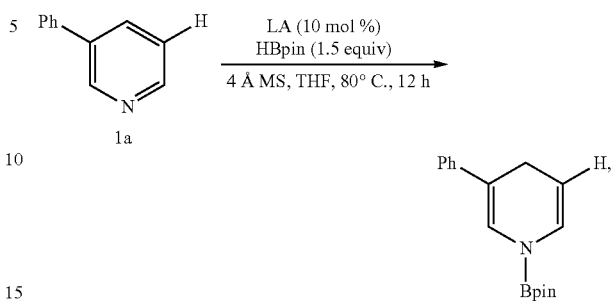

wherein the catalyst LA was the same as that in Example 1, i.e. B $(3,5\text{-}(CF_3)_2C_6H_3)_3$; and S2, cooling the system to room temperature, and adding 84.4 mg (0.4 mmol, 2.0 equiv) of cyclohexanecarboxaldehyde N-Boc imine (2b) to the reaction vial, and reacting the mixture at 80° C. for 24 hours, with the reaction formula as follows:

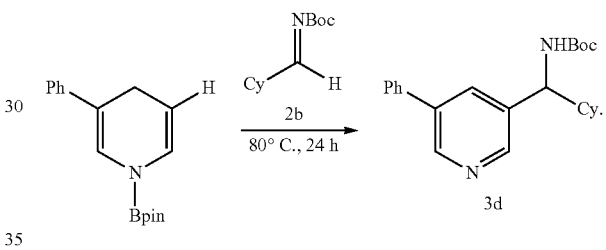

After the reaction was completed, the solvent was removed by rotary evaporation, and the residue was separated and purified by silica gel column chromatography to obtain the product 3-(1-cyclohexyl N-Boc-methylamino)-5-phenylpyridine (tert-butyl (cyclohexyl (5-phenylpyridin-3-yl)methyl)carbamate) (3d) as a white solid, with a yield of 55%.

The product was characterized as follows:

$^1$H NMR (400 MHZ, CDCl$_3$) δ 8.73 (d, J=2.0 Hz, 1H), 8.47 (s, 1H), 7.69 (t, J=2.0 Hz, 1H), 7.59-7.57 (m, 2H), 7.50-7.46 (m, 2H), 7.43-7.39 (m, 1H), 5.06 (d, J=8.2 Hz, 1H), 4.54 (s, 1H), 1.90-1.49 (m, 5H), 1.42 (s, 9H), 1.26-0.96 (m, 6H). $^{13}$C NMR (101 MHZ, CDCl$_3$) δ 155.6, 147.6, 147.1, 138.0, 136.4, 133.1, 129.2, 128.3, 127.4, 79.9, 58.2, 43.4, 30.2, 29.2, 28.5, 26.3, 26.2, 26.1. HRMS-ESI: m/z calculated for $C_{23}H_{31}N_2O_2^+$ (M+H)$^+$ 367.2380. found 367.2383.

Example 5

A method for synthesizing 3-(4-nitrobenzyl)-5-phenylpyridine, the method comprising the following steps:

S1, in a glove box filled with nitrogen, 13.0 mg (0.02 mmol, 10.0 mol %) of a catalyst (LA), a 4 Å molecular sieve (50 mg), 1 mL of tetrahydrofuran, 38.4 mg (0.3 mmol, 1.5 equiv) of pinacolborane and 31.0 mg (0.2 mmol, 1.0 equiv) of 3-phenylpyridine (1a) were added to an 8 mL reaction vial in order, and reacted at 80° C. for 12 hours to obtain 1,4-dihydropyridine, with the reaction formula as follows:

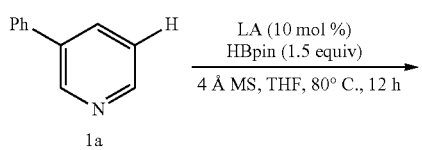

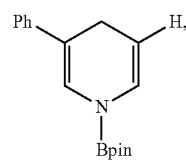

wherein the catalyst LA was the same as that in Example 1, i.e. B (3,5-(CF$_3$)$_2$C$_6$H$_3$)$_3$; and S2, cooling the system to room temperature, adding 60.4 mg (0.4 mmol, 2.0 equiv) of 4-nitrobenzaldehyde (2c) to the reaction vial, and reacting the mixture at 80° C. for 24 hours, with the reaction formula as follows:

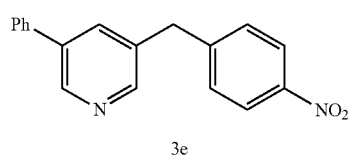

the structural formula 4-nitrobenzaldehyde (2c) was

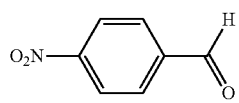 [SMILES: O=Cc1ccc([N+](=O)[O-])cc1]

After the reaction was completed, the solvent was removed by rotary evaporation, and the residue was separated and purified by silica gel column chromatography to obtain the product 3-(4-nitrobenzyl)-5-phenylpyridine (3-(4-nitrobenzyl)-5-phenylpyridine) (3e) as a white solid, with a yield of 51%.

The product was characterized as follows:
$^1$H NMR (400 MHZ, CDCl$_3$) δ 8.75 (s, 1H), 8.49 (s, 1H), 8.18 (d, J=8.7 Hz, 2H), 7.63 (s, 1H), 7.55-7.53 (m, 2H), 7.49-7.45 (m, 2H), 7.42-7.38 (m, 3H), 4.16 (s, 2H). $^{13}$C NMR (101 MHz, CDCl$_3$) δ 148.9, 147.5, 147.1, 147.0, 137.6, 137.0, 134.9, 134.8, 129.9, 129.3, 128.5, 127.3, 124.2, 39.0. HRMS-ESI: m/z calculated for C$_{18}$H$_{15}$N$_2$O$_2$$^+$ (M+H)$^+$ 291.1128. found 291.1127.

Example 6

A method for synthesizing diethyl 2-hydroxy-2-(5-phenyl-3-pyridyl) malonate, the method comprising the following steps:

S1, in a glove box filled with nitrogen, 13.0 mg (0.02 mmol, 10.0 mol %) of a catalyst (LA), a 4 Å molecular sieve (50 mg), 1 mL of tetrahydrofuran, 38.4 mg (0.3 mmol, 1.5 equiv) of pinacolborane and 31.0 mg (0.2 mmol, 1.0 equiv) of 3-phenylpyridine (1a) were added to an 8 mL reaction vial in order, and reacted at 80° C. for 12 hours to obtain 1,4-dihydropyridine, with the reaction formula as follows:

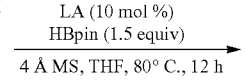

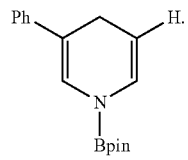

wherein the catalyst LA was the same as that in Example 1, i.e. B (3,5-(CF$_3$)$_2$C$_6$H$_3$)$_3$; and S2, cooling the system to room temperature, adding 69.6 mg (0.4 mmol, 2.0 equiv) of diethyl ketomalonate (2d) to the reaction vial, and reacting the mixture at 80° C. for 24 hours, with the reaction formula as follows:

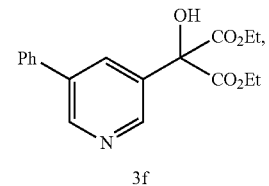

the structural formula of diethyl ketomalonate (2d) was

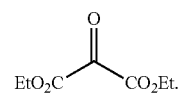

After the reaction was completed, the solvent was removed by rotary evaporation, and the residue was separated and purified by silica gel column chromatography to obtain the product diethyl 2-hydroxy-2-(5-phenylpyridin-3-yl) malonate (diethyl 2-hydroxy-2-(5-phenylpyridin-3-yl) malonate) (3f) as a white solid, with a yield of 58%.

The product was characterized as follows:
$^1$H NMR (400 MHZ, CDCl$_3$) δ 8.89 (d, J=2.1 Hz, 1H), 8.82 (d, J=2.1 Hz, 1H), 8.23 (t, J=2.1 Hz, 1H), 7.60 (d, J=7.3 Hz, 2H), 7.49 (t, J=7.4 Hz, 2H), 7.42 (t, J=7.3 Hz, 1H), 4.65 (s, 1H), 4.34 (qq, J=10.7, 7.1 Hz, 4H), 1.32 (t, J=7.1 Hz, 6H). $^{13}$C NMR (101 MHZ, CDCl$_3$) δ 169.4, 148.1, 147.3, 137.7, 136.1, 133.2, 132.0, 129.3, 128.4, 127.4, 78.9, 63.6, 14.1. HRMS-ESI: m/z calculated for C$_{18}$H$_{20}$NO$_5$$^+$ (M+H)$^+$ 330.1336. found 330.1333.

Example 7

A method for synthesizing 3-chloro-5-phenylpyridine, the method comprising the following steps:

S1, in a glove box filled with nitrogen, 13.0 mg (0.02 mmol, 10.0 mol %) of a catalyst (LA), 1 mL of tetrahydrofuran, 38.4 mg (0.3 mmol, 1.5 equiv) of pinacolborane and 31.0 mg (0.2 mmol, 1.0 equiv) of 3-phenylpyridine (1a) were added to an 8 mL reaction vial in order, and reacted at 80° C. for 12 hours to obtain 1,4-dihydropyridine, with the reaction formula as follows:

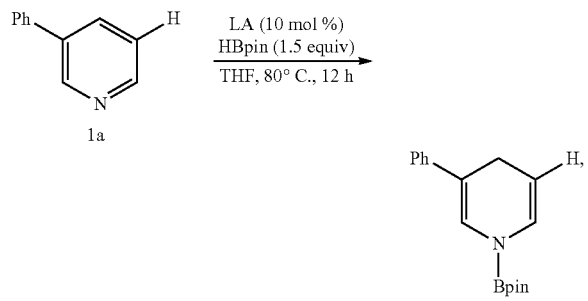

wherein the catalyst LA was B(2,4,6-F$_3$C$_6$H$_3$)$_3$, and the structural formula was as follows:

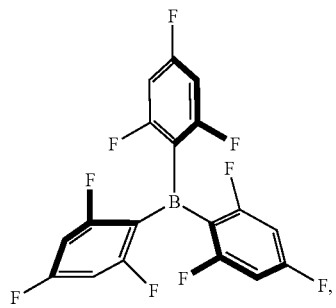

S2, cooling the system to room temperature, adding 87.0 mg (0.4 mmol, 2.0 equiv) of N-chloro-o-benzosulfimide (2e) to the reaction vial, and reacting the mixture at 40° C. for 12 hours, with the reaction formula as follows:

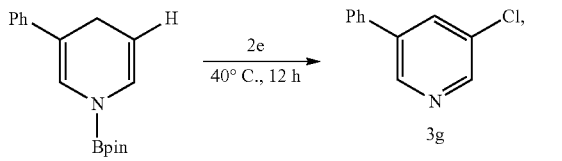

the structural formula of N-chloro-o-benzosulfimide (2e) was

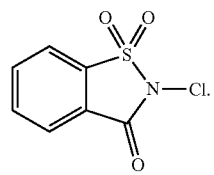 [SMILES: O=C1c2ccccc2S(=O)(=O)N1Cl]

After the reaction was completed, the solvent was removed by rotary evaporation, and the residue was separated and purified by silica gel column chromatography to obtain the product 3-chloro-5-phenylpyridine (3-chloro-5-phenylpyridine) (3g) as a white solid, with a yield of 82%.

The product was characterized as follows:
$^1$H NMR (400 MHZ, CDCl$_3$) δ 8.72 (s, 1H), 8.56 (s, 1H), 7.86 (t, J=2.0 Hz, 1H), 7.60-7.53 (m, 2H), 7.52-7.40 (m, 3H). $^{13}$C NMR (101 MHz, CDCl$_3$) δ 147.4, 146.2, 138.0, 136.5, 134.2, 132.3, 129.4, 128.8, 127.3. HRMS-ESI: m/z calculated for C$_{11}$H$_9$ClN (M+H)$^+$ 190.0418. found 190.0417.

Example 8

A method for synthesizing 3-bromo-5-phenylpyridine, the method comprising the following steps:

S1, in a glove box filled with nitrogen, 8.0 mg (0.02 mmol, 10.0 mol %) of a catalyst (LA), 1 mL of tetrahydrofuran, 38.4 mg (0.3 mmol, 1.5 equiv) of pinacolborane and 31.0 mg (0.2 mmol, 1.0 equiv) of 3-phenylpyridine (1a) were added to an 8 mL reaction vial in order, and reacted at 80° C. for 12 hours to obtain 1,4-dihydropyridine, with the reaction formula as follows:

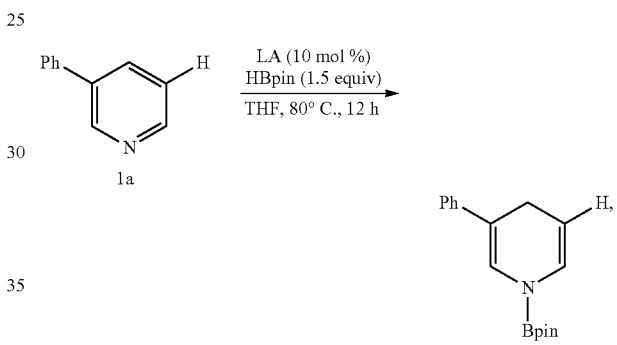

wherein the catalyst LA was the same as that in Example 7, i.e. B(2,4,6-F$_3$C$_6$H$_3$)$_3$; and S2, cooling the system to room temperature, adding 104.0 mg (0.4 mmol, 2.0 equiv) of N-bromo-o-benzosulfimide (2f) to the reaction vial, and reacting the mixture at 40° C. for 12 hours, with the reaction formula as follows:

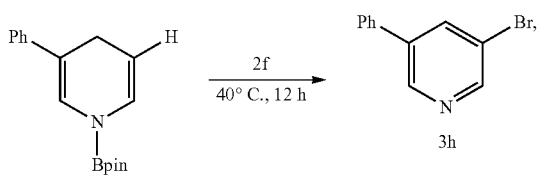

the structural formula of N-bromo-o-benzosulfimide (2f) was

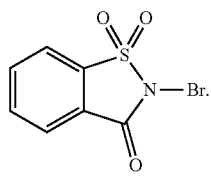

After the reaction was completed, the solvent was removed by rotary evaporation, and the residue was separated and purified by silica gel column chromatography to synthesize the product 3-bromo-5-phenylpyridine (3-bromo-5-phenylpyridine) (3h) as a white solid, with a yield of 62%.

The product was characterized as follows:
$^1$H NMR (400 MHZ, CDCl$_3$) δ 8.75 (d, J=2.0 Hz, 1H), 8.65 (d, J=2.0 Hz, 1H), 8.01 (t, J=2.1 Hz, 1H), 7.56-7.53 (m, 2H), 7.50-7.46 (m, 2H), 7.45-7.41 (m, 1H). $^{13}$C NMR (101 MHZ, CDCl$_3$) δ 149.5, 146.5, 138.4, 137.0, 136.4, 129.4, 128.9, 127.3, 121.1. HRMS-ESI: m/z calculated for C$_{11}$H$_9$BrN$^+$ (M+H)$^+$ 233.9913. found 233.9913.

What is claimed is:

1. A method for preparing a meta-functionalized pyridine compound, the method comprising the following steps:
S1, preparation of 1,4-dihydropyridine, involving:
in a glove box filled with nitrogen, adding a catalyst, a solvent, pinacolborane and pyridine to a reaction flask in order and stirring the mixture for a sufficient reaction to obtain 1,4-dihydropyridine, with the reaction formula as follows:

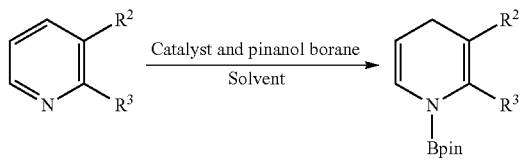

wherein:
the catalyst is triarylborane, the molar ratio of the triarylborane to the pyridine is (10-15): 100, and the structural formula of the triarylborane is B(R$^1$)$_3$, wherein R$^1$ is phenyl, pentafluorophenyl, 3,5-bis(trifluoromethyl)-substituted phenyl, or 2,4,6-trifluoro-substituted phenyl;
the equivalent ratio of the pinacolborane to the pyridine is 1.5:1;
the solvent is tetrahydrofuran, 1,2-dichloroethane or an aromatic solvent; and
the reaction temperature is 40-110° C., and the reaction time is 5-12 hours; and
S2, catalyzed functionalization of pyridine at the meta-position, involving:
adding an imine, an aldehyde, a ketone or a halogenation reagent to the above reaction flask, and stirring the mixture in a nitrogen atmosphere until the reaction is completed; and performing distillation under reduced pressure to remove the solvent and column chromatography separation to obtain a pyridine compound substituted with aminomethyl, hydroxymethyl, benzyl, chlorine or bromine at the meta-position, with the reaction formula as follows:

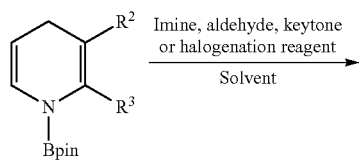

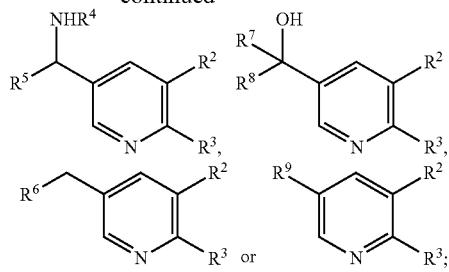

wherein the reaction temperature is 40-110° C., and the reaction time is 5-24 hours; and
in the structural formula of the above pyridine, 1,4-dihydropyridine, and pyridine compound substituted with aminomethyl, hydroxymethyl, benzyl, chlorine or bromine at the meta-position, R$^2$ is an alkenyl, aryl, alkyl, halogen, ester or heteroaryl substituent, R$^3$ is alkyl, R$^4$ is tert-butoxycarbonyl or benzyloxycarbonyl, R$^5$ is an aryl, alkyl or heteroaryl substituent, R$^6$ is aryl, R$^7$ is an ester group, R$^8$ is an ester group or trifluoromethyl, and R$^9$ is chlorine or bromine.

2. The method according to claim 1, wherein a 4 Å molecular sieve is further added to the reactants of step S1, and the feeding ratio of the 4 Å molecular sieve to the pyridine is 50 mg/0.2 mmol.

3. The method according to claim 1, wherein in step S2, the imine is

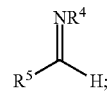

the aldehyde is

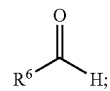

the ketone is

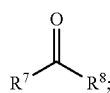

and the halogenation reagent is

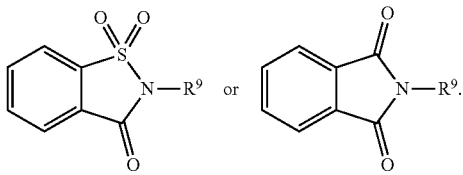

4. The method according to claim 1, wherein when R$^2$ is a halogen, the halogen is fluorine, chlorine or iodine.

5. The method according to claim 1, wherein when R$^2$ is heteroaryl, the heteroaryl is furyl, thienyl or pyridyl.

6. The method according to claim 1, wherein $R^3$ is methyl.

7. The method according to claim 1, wherein when $R^5$ is heteroaryl, the heteroaryl is furyl, thienyl or pyridyl.

8. The method according to claim 1, wherein $R^6$ is m-nitro- or m-trifluoromethyl-substituted phenyl.

9. The method according to claim 1, wherein $R^7$ is a methyl ester group or an ethyl ester group.

10. The method according to claim 1, wherein when $R^8$ is an ester group, the ester group is a methyl ester group or an ethyl ester group.

11. The method according to claim 2, wherein in step S2, the imine is

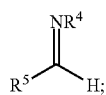

the aldehyde is

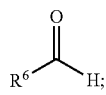

the ketone is

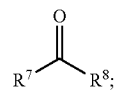

and the halogenation reagent is

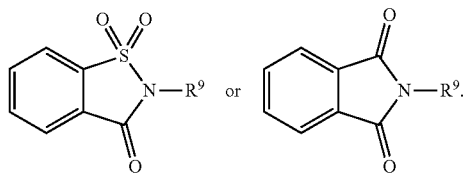

12. The method according to claim 2, wherein $R^3$ is methyl.

13. The method according to claim 2, wherein when $R^5$ is heteroaryl, the heteroaryl is furyl, thienyl or pyridyl.

14. The method according to claim 2, wherein $R^6$ is m-nitro- or m-trifluoromethyl-substituted phenyl.

15. The method according to claim 2, wherein $R^7$ is a methyl ester group or an ethyl ester group.

16. The method according to claim 2, wherein when $R^8$ is an ester group, the ester group is a methyl ester group or an ethyl ester group.

* * * * *